United States Patent
Povzner et al.

(10) Patent No.: US 9,170,752 B2
(45) Date of Patent: Oct. 27, 2015

(54) DYNAMIC FEEDBACK-BASED THROUGHPUT CONTROL FOR BLACK-BOX STORAGE SYSTEMS

(71) Applicant: INTERNATIONAL BUSINESS MACHINES CORPORATION, Armonk, NY (US)

(72) Inventors: Anna S. Povzner, San Jose, CA (US); Renu Tewari, San Jose, CA (US); Noah Watkins, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 14/135,455

(22) Filed: Dec. 19, 2013

(65) Prior Publication Data

US 2015/0178015 A1    Jun. 25, 2015

(51) Int. Cl.
 *G06F 3/06* (2006.01)

(52) U.S. Cl.
 CPC ............ *G06F 3/0653* (2013.01); *G06F 3/0613* (2013.01); *G06F 3/0658* (2013.01); *G06F 3/0673* (2013.01)

(58) Field of Classification Search
 CPC ... G06F 3/0613; G06F 3/0653; G06F 3/0658; G06F 3/0673
 See application file for complete search history.

(56) References Cited

U.S. PATENT DOCUMENTS

| | | | |
|---|---|---|---|
| 5,936,940 A * | 8/1999 | Marin et al. | 370/232 |
| 7,757,013 B1 * | 7/2010 | Lawson et al. | 710/15 |
| 8,161,260 B2 | 4/2012 | Srinivasan | |
| 2005/0237935 A1 * | 10/2005 | Chae et al. | 370/232 |
| 2006/0287737 A1 | 12/2006 | Karlsson | |
| 2007/0076613 A1 * | 4/2007 | Malhotra et al. | 370/235.1 |
| 2007/0226332 A1 * | 9/2007 | Becker-Szendy et al. | 709/224 |
| 2010/0246596 A1 * | 9/2010 | Nakamura et al. | 370/428 |
| 2012/0005685 A1 | 1/2012 | Chen | |
| 2012/0054329 A1 | 3/2012 | Gulati | |

FOREIGN PATENT DOCUMENTS

WO    2012096652 A1    7/2012

OTHER PUBLICATIONS

Povzner, A.S., Tewari, R. & Watkins, N. "Disclosure Review Dynamic Feedback-based Throughput Control for Black-box Storage Systems." Presentation, Nov. 20, 2012, slides 1-11, IBM Almaden Research Center, San Jose, CA.

(Continued)

*Primary Examiner* — Eric Oberly
(74) *Attorney, Agent, or Firm* — Erik Huestis; Stephen Kenny; Foley Hoag LLP

(57) ABSTRACT

Embodiments of the present invention relate to dynamic feedback-based throughput control for storage systems. In one embodiment, a method of and computer program product for storage throughput control are provided. A plurality of I/O requests is received at a rate controller. The plurality of I/O requests is sent from the rate controller to a storage system at a first rate. Throughput of the storage system is observed. The first rate is dynamically adjusted based on the variance between the observed throughput of the storage system and the first rate.

20 Claims, 6 Drawing Sheets

(56) References Cited

OTHER PUBLICATIONS

Karlsson, M., Karamanolis, C. & Zhu, X. "Triage:Performance Differentiation for Storage Systems Using Adaptive Control." ACM Transactions on Storage, vol. 1, No. 4, (Nov. 2005) 457-480.

Kelly, T., Cohen, I., Goldszmidt, M., & Keeton, K. "Inducing Models of Black-Box Storage Arrays." Internet Systems and Storage Laboratory, Hewlett-Packard Laboratories, Palo Alto, CA. HPL-2004-108, (Jun. 2004) 1-14.

* cited by examiner

DYNAMIC FEEDBACK-BASED THROUGHPUT CONTROL FOR BLACK-BOX STORAGE SYSTEMS

BACKGROUND

Embodiments of the present invention relate to storage throughput control, and more specifically, to dynamic feedback-based throughput control for storage systems.

BRIEF SUMMARY

According to one embodiment of the present invention, a method of and computer program product for storage throughput control are provided. A plurality of I/O requests is received at a rate controller. The plurality of I/O requests is sent from the rate controller to a storage system at a control rate. Throughput of the storage system is observed. The first rate is dynamically adjusted based on the variance between the observed throughput of the storage system and the control rate.

DETAILED DESCRIPTION

The subject matter of the present disclosure relates to throughput control in a black box storage system. Multi-tenancy support in a storage system is important in cloud and virtualized environments. For example, service level agreements (SLAs) for web services may require certain performance metrics to be met for each of a plurality of concurrent users. Adhering to a storage SLA may require isolating user application requests from file system background processes. For example, network-based or distributed file systems may require periodic maintenance tasks to be completed for Information Lifecycle Management (ILM) or restriping in GPFS. Shares of storage throughput capacity may be assigned to individual workload classes (or services classes). However, in an uncontrolled environment, foreground and background workloads may compete for shared storage, resulting in slowdowns or failure to meet the SLA for all workloads. According to embodiments of the present disclosure, methods and systems are provided for sharing of storage throughput between sources of I/O requests in black-box storage systems.

According to embodiments of the present invention, a method is provided for throughput control in a system with multiple sources of service requests or jobs (service classes). Each service class or set of service classes may have one or more throughput requirements. These may include that each service class must be guaranteed a share of the total available system throughput or that each service class must be guaranteed a minimum throughput, but if the total requested minimum throughput from all service classes exceeds the available system throughput, each service class is guaranteed a throughput share proportional to its reservation. The systems and methods provided herein are applicable for controlling throughput in I/O requests per second or bytes per second.

Figure 1:
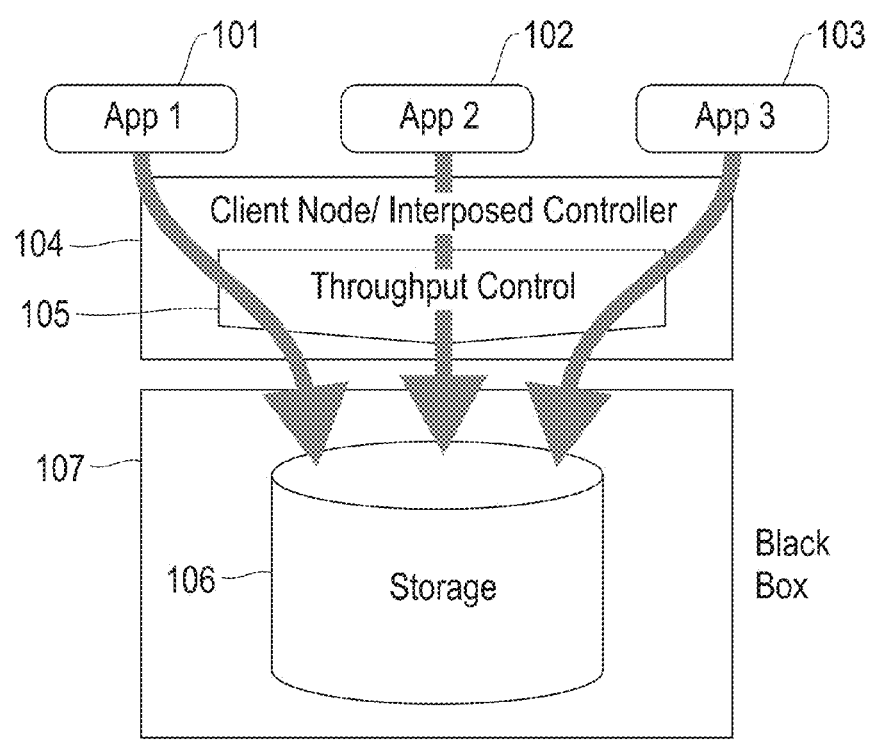
FIG. 1 depicts an exemplary architecture for a black box storage system according to an embodiment of the present disclosure.

With reference to FIG. 1, an exemplary architecture for a black box storage system is provided. Applications 101, 102, 103 each submit requests to a client or controller 104. Client or controller 104 contains throughput control logic 105. After application of throughput control logic 105 to each request, the requests are dispatched to storage 106 for service. In some embodiments, storage 106 is isolated from other entities in the system, illustrated by black box 107. In some embodiments, controller 104 comprises a computer system interposed between applications 101, 102, 103 and storage 106. In some embodiments, controller 104 is a virtual controller. A virtual controller may be embedded in a storage system, or may operate on an external computer system.

One approach to throughput control in a black-box system assumes that there is an external capacity planner or an admission controller that determines that the storage system can accommodate the requested throughput demands. Another approach is to infer system throughput capacity from benchmark sampling. Benchmark sampling generally measures a worst-case performance (with a random read/write micro-benchmark), which results in a conservative estimate of system available throughput, resulting in a less than optimal system utilization. On the other hand, an optimistic estimate may result in missing the performance targets of certain service classes. Thus, although periodic benchmark sampling can detect changes in system configuration, it cannot determine the system capacity available to the currently running mix of workloads. Moreover, online sampling is impractical for large enterprise deployments, as customers may not tolerate injections of unnecessary load in production systems.

Accordingly, the systems and methods set forth below do not require any a priori knowledge of the available system throughput capacity or its model, and do not require any controlled load injections to the system. These systems and methods are based on a rate controller with a feedback control loop that dynamically adapts to the current, workload-dependent system performance. In some embodiments, the rate controller comprises a leaky bucket.

Embodiments of the present disclosure provide both proportional and absolute sharing of storage throughput between service classes in black-box storage systems while optimally utilizing the total available system capacity. By collecting statistics, embodiments of the present disclosure constantly observe whether there is a contention between service classes. An explicit definition of contention is used, specifically, whether service classes achieved their requested throughput shares. This approach maximizes the utilization of the total available system capacity by constantly probing if the system can handle a higher load. If the observed contention becomes higher than the accepted variance, the load admitted to the system is decreased. To minimize fluctuation of controller rate around the contention point, a token adjustment algorithm in a leaky bucket is provided, that corrects for over-estimation of the available system capacity.

Thus, throughput is controlled using observations of the currently running mix of workloads without requiring knowledge about a system model or about its total available throughput capacity. In addition, throughput sharing is provided while optimally utilizing the total available system capacity by using optimistic, but auto-correcting, throughput control.

Figure 2:
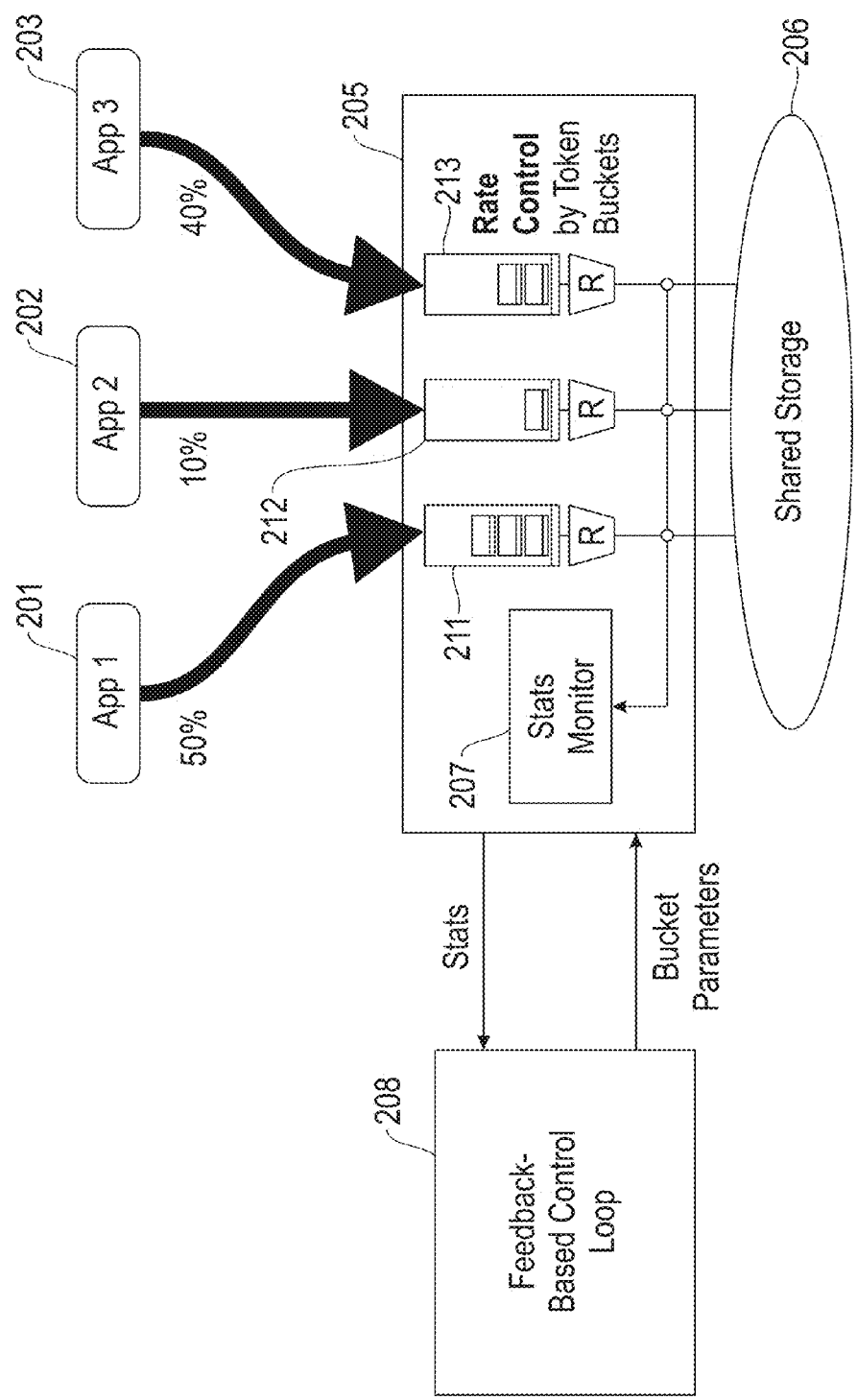
FIG. 2 depicts a rate control system according to an embodiment of the present disclosure.

With reference to FIG. 2, an exemplary rate control system according to an embodiment of the present disclosure is provided. The system comprises a rate controller 205, a statistics monitor 207 and a feedback control loop 208. Rate controller 205 comprises a set of leaky buckets 211, 212, 213, one for each service class, that control the rate of I/O requests admitted to the underlying black-box shared storage 206. Statistics monitor 207 collects the statistics on the performance of the underlying system. Feedback control loop 208 periodically updates the parameters of the rate controller, such as the rates of the leaky buckets.

Applications 201, 202, 203 send I/O requests to rate controller 205. The throughput rate of each application's requests is determined by leaky buckets 211, 212, 213. Requests are directed to shared storage 206 at the rate determined by the leaky buckets. Statistics monitor 207 collects statistics and sends them to feedback-based control look 208. Control loop 208 determines bucket parameters based on statistics 207, which are used to configure leaky buckets 211, 212, 213.

Feedback-based control loop 208 integrates determination of storage system throughput capacity with on-the-fly adaptation of total I/O rate admitted to the underlying system to the current, workload dependent system throughput capacity. Control loop 208 performs the relevant adjustments of parameters of leaky token buckets (e.g., 211, 212, 213) based on the variance between the observed throughput of the storage system and the control rate. These components enable proportional sharing of the total available system throughput capacity, as described further below. The methods of the present disclosure may also be used to provide absolute throughput targets for service classes.

Suppose $R(t)$ is the total rate admitted to the underlying system (also called total rate limit), during a time interval t. A leaky bucket that controls the rate of service class i with a reserved throughput share $Share_i$ has a refill rate $R_i(t)=R(t)*Share_i$.

Every time interval, the feedback control loop 208 queries statistics monitor 207 and retrieves average throughput observed in the last time interval for each service class i: $T_i(t)$. To take into account that some service classes may be idle, the control loop calculates adjusted total observed throughput $T_{adj}(t)$ and adjusted total rate limit $R_{adj}(t)$ according to Equations 1 and 2, below.

$$T_{adj}(t)=\Sigma_{non-idle}T_i(t) \quad \text{Equation 1}$$

$$R_{adj}(t)=\Sigma_{non-idle}R_i(t) \quad \text{Equation 2}$$

The control loop calculates the relative error according to Equation 3, below.

$$\hat{E}=|T_{adj}(t)-R_{adj}(t)|/R_{adj}(t) \quad \text{Equation 3}$$

In some embodiments, the control loop may instead calculate the relative error without taking into account that some service classes may be idle as follows: $\hat{E}=|T(t)-R_{adj}(t)|/R(t)$. However, the relative error calculation in Equation 3 re-distributes the available system capacity, temporarily un-used by the idle service classes, between all non-idle service classes. Thus, when a service classes becomes idle, the control loop adapts to a new (non-idle) mix of workloads.

Using the relative error calculated using Equation 3, the control loop calculates the total rate limit for the next time interval $R(t+1)$ as follows. If $(\hat{E}<\epsilon)$ then $R(t+1)=R(t)*f_{inc}$; else if $(\hat{E}<v)$ then $R(t+1)=R(t)$; else $R(t+1)=R(t)*f_{dec}$. The constants $\epsilon$, $v$, $f_{inc}$, and $f_{dec}$ are control loop parameters: $\epsilon$ is a constant that indicates that an error (relative difference) is negligibly small (e.g., $\epsilon=0.01$), $v$ is an accepted variance of the observed rate (e.g. $v=0.05$), $f_{inc}$ is an increase factor by which the admitted rate is increased, and $f_{dec}$ is a decrease factor by which the admitted rate is decreased. In our preferred embodiment, $f_{dec}=1-v$ and $f_{inc}=1+v/2$.

The Control Loop observes contention by comparing the rate admitted to the system with the observed throughput (while discounting idle workloads) and finding that relative error is higher than an accepted variance. In that case, the Control Loop decreases the rate admitted to the system, $R(t+1)=R(t)*f_{dec}$. If the observed throughput is in very close proximity to the current rate limit ($\hat{E}<\epsilon$), it means that the storage system can sustain the rates of workload classes and their reserved shares. However, the storage system may be able to sustain a higher total rate. The Control Loop therefore increases the rate admitted to the system ($R(t+1)=R(t)*f_{inc}$). Thus, the Control Loop detects the proximity to the highest possible rate the system can achieve while at the same time providing reserved capacity shares to workload classes by increasing the rate of I/O requests admitted to the system until the achieved throughput is lower than the rate limit, which the Control Loop identifies as the point of contention or system capacity for the currently running set of workloads. This obviates the need to know system capacity (separately identified by benchmarking, capacity planning, etc.) in order to compare to the observed performance and increase or decrease the rate or number of I/O requests outstanding at the system.

As described above, if $(\hat{E}<\epsilon)$ then $R(t+1)=R(t)*f_{inc}$, else $R(t+1)=R(t)*f_{dec}$. To prevent constant fluctuation around the contention point during a steady state, some embodiments perform an additional check. If the observed throughput is within accepted variance of the rate limit, the rate limit remains unchanged: else if $(\hat{E}<v)$ then $R(t+1)=R(t)$. Adding (else if $(\hat{E}<v)$ then $R(t+1)=R(t)$) will decrease fluctuation of throughput around the contention point.

Figure 3:
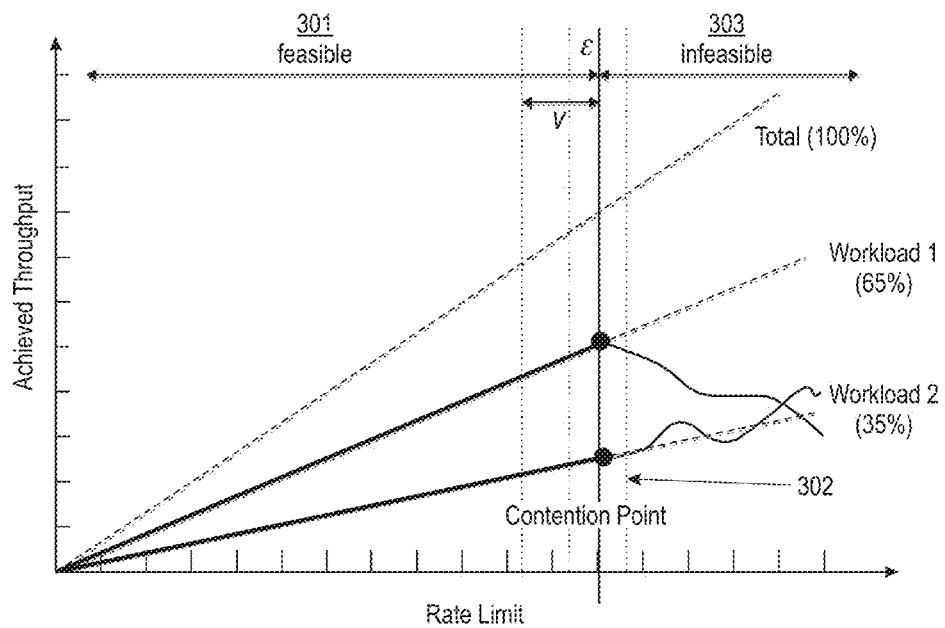
FIG. 3 illustrates the throughput behavior of a control loop according to an embodiment of the present disclosure.

FIG. 3 illustrates the throughput behavior of the control loop according to an embodiment of the present disclosure. Throughout the feasible region 301 in which $\hat{E}<\epsilon$, load is constantly increased until contention is observed. At contention point 302, achieved throughput no longer increases with the rate limit, marking the beginning of infeasible region 303.

In some embodiments, the control loop may use a larger increase factor, $f_{inc}$, if it detects that the total observed rate was increasing for several consecutive control loop periods, so that the admitted rate reaches the maximum feasible rate (when the reserved shares can be met) faster.

The control loop provides the new calculated total rate limit $R(t+1)$ and the rate error $T_{adj}(t)-R_{adj}(t)$ to the rate controller, and the rate controller updates the refill rate of each leaky bucket based on new total rate limit.

The Control Loop operates optimistically. It probes for a higher rate if the observed rate is in close proximity to the rate limit R even if the system may not be able to sustain that rate. If the rate limit cannot be met, it can only be observed after the fact. As a result, the Control Loop will likely over-estimate the system throughput capacity. To avoid fluctuation of the control rate around the contention point when the Control Loop finds currently available storage system capacity, a token bucket algorithm is provided that immediately corrects the over-estimation as soon as contention is observed.

Figure 4:
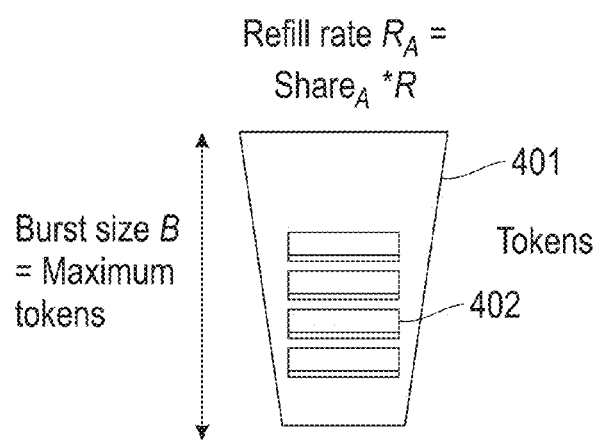
FIG. 4 depicts a token bucket according to an embodiment of the present disclosure.

FIG. 4 depicts an exemplary token bucket 401. Token bucket 401 contains b tokens 402 up to bucket size B, which corresponds to the burst size. According to embodiments of the present disclosure the token bucket is represented by a counter that accumulates tokens at rate R until the counter reaches the token bucket size B. Upon arrival of an I/O request, if enough tokens are accumulated, an I/O request is dispatched to the underlying system and the counter is decreased by the cost of this I/O. Otherwise, I/O is queued and dispatched when enough tokens are accumulated. In some embodiments the cost of an I/O request is proportional to the size of the requested data.

The current number of tokens in each token bucket is decreased to account for over-estimation of rate in the previous time interval. Since each token bucket i created tokens based on rate $R_i(t)=R(t)*Share_i$, but the system could only sustain throughput T(t), the adjustment compensates for extra tokens created based on the optimistic rate. (Note, here R(t) and T(t) are used to also indicate $T_{adj}(t)$ and $R_{adj}(t)$).

This approach compensates for extra tokens that were created and consumed by I/O requests and not the tokens that were lost because the number of tokens reached the bucket size. Because the token bucket counter does not represent the tokens that were lost, the auto-correcting token bucket keeps an additional counter $c_i$, uncapped counter, for each bucket i. The uncapped counter represents all tokens that were generated during the last time interval but not consumed by I/O requests. This counter accumulates tokens at rate R, but in contrast to token bucket counter $b_i$, it is never capped to the token bucket size. When an I/O request is dispatched to the underlying storage system, both counters are decremented by the number of tokens consumed by this I/O request.

In some embodiments, instead of the uncapped counter, the auto-correcting token bucket keeps expired token counter $d_i$. The expired token counter, $d_i$, is incremented each time a generated token is lost due to the total number of tokens reaching the token bucket size (i.e. if a token is generated and $b_i$ equals B, increment $d_i$, otherwise increment $b_i$). When an I/O request is dispatched to the underlying storage system, both counters are decremented by the number of tokens consumed by this I/O request. Note the relationship between uncapped counter, $c_i$, expired token counter, $d_i$, and token bucket counter, $b_i$: $c_i=b_i+d_i$.

In the end of each Control Loop time interval, the Control Loop provides a new rate limit, R(t+1), to the rate controller and also provides the rate error, T(t)−R(t). In response to this, the rate controller adjusts uncapped counter by the number of extra tokens that were created due to the optimistic rate by token bucket i: $Share_i*(T(t)-R(t))*P$, and if those extra tokens were used to dispatch I/O requests (checked by condition if ($c_i<b_i$)), then token bucket counter $b_i$ is updated to compensate for extra tokens created based on the optimistic rate (i.e., the rate that was higher than the system's throughput capacity). Specifically, the algorithm for updating $c_i$ and $b_i$ in each token bucket is as follows: $c_i:=c_i+Share_i*(T(t)-R(t))*P$; if ($c_i<b_i$) then $b_i:=c_i$; $c_i:=b_i$, where P is a period of feedback control loop. Thus, a negative number of tokens may be set. This effectively postpones the creation of a first token in a token bucket, since I/O requests can only consume a positive number of tokens. When the condition ($c_i<b_i$) is false, the extra tokens created based on the optimistic rate were discarded and not used to serve I/O requests, so, there is no need to adjust the token bucket counter in that case.

If instead expired token counter $d_i$ is used, then the token correction algorithm (in the end of each control loop time interval) is as follows, where $c_i$ is a temporary variable: $c_i:=d_i+b_i+Share_i*(T(t)-R(t))*P$; if ($c_i<b_i$) then $b_i:=c_i$; $d_i:=0$. If the rate in the previous time interval was too high and the system could not support all admitted I/O requests, adjusting the number of tokens drains the over-admitted I/O requests from the system.

Figure 5:
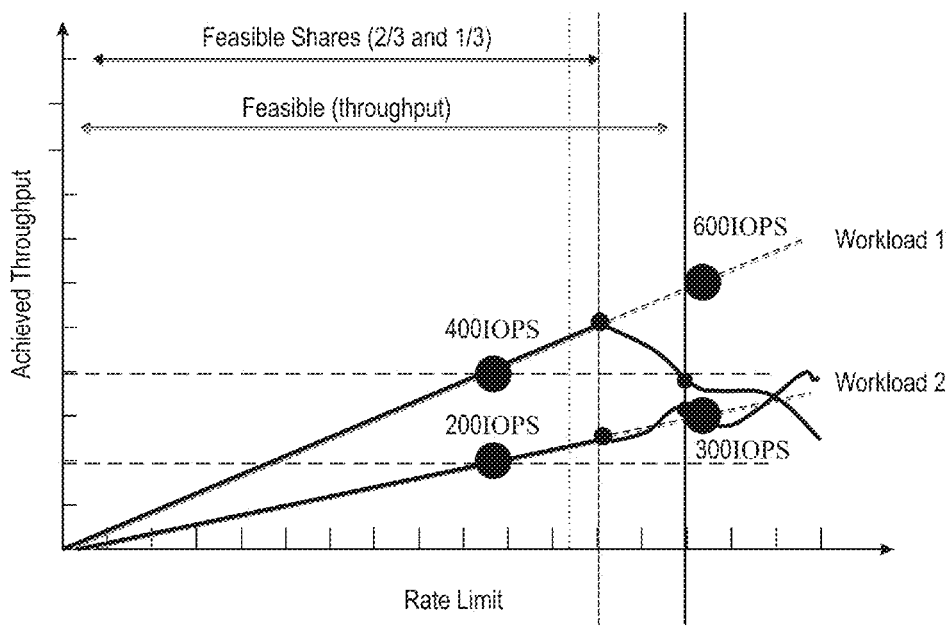
FIG. 5 illustrates the behavior of an exemplary embodiment of the present disclosure providing throughput targets to service classes.

FIG. 5 illustrates the behavior of an exemplary embodiment that additionally provides specific throughput targets to service classes. In some embodiments, the above control loop and token bucket further include specific throughput reservations for service classes. Suppose each service class i requests minimum throughput reservation $\beta_i$. The feedback control loop calculates a share reservation $Share_i$ according to Equation 4, where n is the total number of service classes in a system.

$$Share_i = \beta_i / \Sigma_{j=i \ldots n} \beta_j \qquad \text{Equation 4}$$

If the total system capacity is larger than the total sum of the reserved minimum rates, the system is probed to determine whether it can support a larger load (i.e. admits larger rate to the system than the total reserved), as long as each service class receives its reserved throughput. If the total available system capacity is smaller than the total sum of the reserved minimum rates, the mechanism provides shares of the available throughput capacity to service classes proportional to their reservations: $Share_i$ calculated with Equation 4.

Specifically, the feedback control loop calculates adjusted total rate limit and adjusted observed rate according to Equations 5 and 6.

$$T_{adj}(t) = \Sigma_{non-idle} \min(T_i(t), \beta_i) \qquad \text{Equation 5}$$

$$R_{adj}(t) = \min(\Sigma_{non-idle} R_i(t), \Sigma_{non-idle} \beta_i) \qquad \text{Equation 6}$$

The control loop calculates the normalized error Ê using Equation 3 as described above, but using $T_{adj}(t)$ and $R_{adj}(t)$ calculated with Equation 5 and Equation 6.

If the total available system capacity is smaller than the total sum of the reserved minimum rates, the observed workload throughputs will be below their reservations, and so $T_{adj}=\Sigma_{non-idle}T_i(t)$, as in Equation 1. The mechanism will also converge to admitting total rate below the total reserved rate: $R_{adj}(t)=\Sigma_{non-idle}R_i(t)$, same as Equation 2. Thus, in that case, the algorithm provides proportional shares $Share_i$ calculated with Equation 4.

Figure 6:
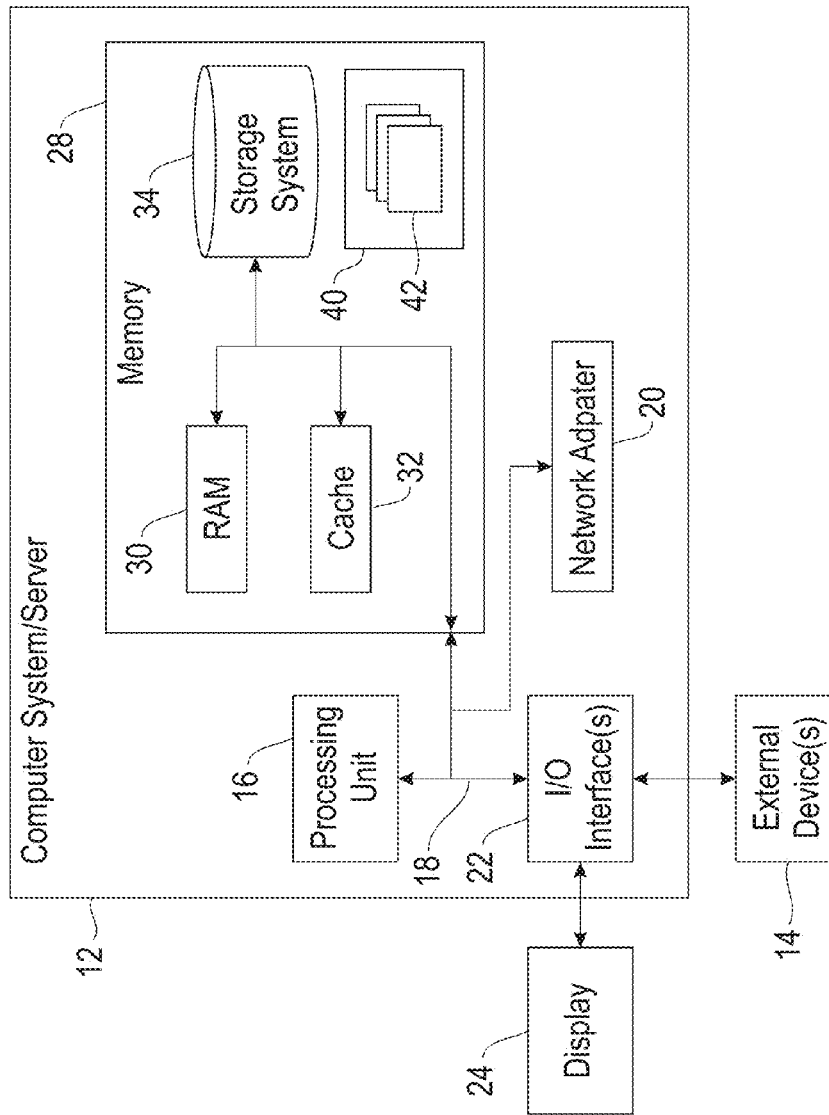
FIG. 6 depicts a computing node according to an embodiment of the present invention.

Referring now to FIG. 6, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving a plurality of I/O requests at a rate controller;
    sending the plurality of I/O requests from the rate controller to a storage system at a control rate;
    observing throughput of the storage system; and
    dynamically adjusting the control rate based on the variance between the observed throughput of the storage system and the control rate, wherein adjusting the control rate comprises:
        determining a deviation between the observed throughput of the storage system and the control rate;
        increasing the control rate if the deviation is less than a first predetermined value;
        maintaining the control rate if the deviation is less than a second predetermined value but not less than the first predetermined value;
        decreasing the control rate if the deviation is greater than the second predetermined value, and wherein
        the deviation is determined by taking the absolute value of the relative error between the observed throughput of the storage system and the control rate.

2. The method of claim 1, wherein each of the plurality of I/O requests has an associated cost and the rate controller comprises a token bucket.

3. The method of claim 2, further comprising:
    sending each of the plurality of I/O requests when the token bucket has at least a number of tokens corresponding to the cost of each I/O request;
    emptying the token bucket of the number of tokens corresponding to the cost of each I/O request; and
    refilling the token bucket at a fill rate corresponding to the control rate.

4. The method of claim 2, wherein the cost of each I/O request is proportional to a size of data requested by that I/O request.

5. The method of claim 1, wherein the first predetermined value is 0.01.

6. The method of claim 1, wherein the second predetermined value is 0.05.

7. The method of claim 1, wherein increasing the control rate comprises multiplying the control rate by a first scaling factor.

8. The method of claim 7, wherein the first scaling factor is increased after increasing the control rate.

9. The method of claim 1, wherein decreasing the control rate comprises multiplying the control rate by a second scaling factor.

10. The method of claim 3, wherein the rate controller comprises a plurality of token buckets, the method further comprising:
    selecting the token bucket from the plurality of token buckets based on a service class of the I/O request.

11. The method of claim 3, further comprising:
    decreasing a number of tokens in the token bucket when the control rate exceeds the throughput.

12. The method of claim 11, wherein decreasing the number of tokens and adjusting the control rate occur periodically.

13. The method of claim 11, wherein the token bucket can have a negative number of tokens, the method further comprising:
    determining a number of excess tokens based on the difference between the control rate and the throughput;
    determining a number of consumed tokens of the excess tokens; and decreasing the number of tokens in the bucket based on the number of consumed tokens.

14. The method of claim 11, wherein the token bucket further comprises an uncapped counter, the method further comprising:
   increasing the uncapped counter at the fill rate;
   decreasing the uncapped counter according to the cost of each I/O request; and
   decreasing the number of tokens in the bucket based on a difference between the uncapped counter and a number of excess tokens.

15. A system comprising:
   a rate controller receiving a plurality of I/O requests;
   a storage system, the storage system receiving the I/O request from the rate controller at a control rate;
   a control loop observing throughput of the storage system and dynamically adjusting the control rate based on the variance between the observed throughput of the storage system and the control rate, wherein adjusting the control rate comprises:
      determining a deviation between the observed throughput of the storage system and the control rate;
      increasing the control rate if the deviation is less than a first predetermined value;
      maintaining the control rate if the deviation is less than a second predetermined value but not less than the first predetermined value;
      decreasing the control rate if the deviation is greater than the second predetermined value, and wherein
      the deviation is determined by taking the absolute value of the relative error between the observed throughput of the storage system and the control rate.

16. A computer program product for storage throughput control, the computer program product comprising a computer readable storage medium having program code embodied therewith, the program code executable by a processor to:
   receive a plurality of I/O requests at a rate controller;
   send the plurality of I/O requests from the rate controller to a storage system at a control rate;
   observe throughput of the storage system; and
   dynamically adjust the control rate based on the variance between the observed throughput of the storage system and the control rate, wherein adjusting the control rate comprises:
      determining a deviation between the observed throughput of the storage system and the control rate;
      increasing the control rate if the deviation is less than a first predetermined value;
      maintaining the control rate if the deviation is less than a second predetermined value but not less than the first predetermined value;
      decreasing the control rate if the deviation is greater than the second predetermined value, and wherein
      the deviation is determined by taking the absolute value of the relative error between the observed throughput of the storage system and the control rate.

17. The system of claim 15, wherein the first predetermined value is 0.01.

18. The system of claim 15, wherein the second predetermined value is 0.05.

19. The computer program product of claim 16, wherein the first predetermined value is 0.01.

20. The computer program product of claim 16, wherein the second predetermined value is 0.05.

* * * * *